United States Patent
Grus

(10) Patent No.: US 11,528,921 B2
(45) Date of Patent: Dec. 20, 2022

(54) DIE FOR A CONFECTIONERY MOULDING MACHINE

(71) Applicant: TNA Australia Pty Limited, Lidcombe (AU)

(72) Inventor: Marek Grus, Springwood (AU)

(73) Assignee: TNA Australia Pty Limited, Lidcombe (AU)

( * ) Notice: Subject to any disclaimer, the term of this patent is extended or adjusted under 35 U.S.C. 154(b) by 459 days.

(21) Appl. No.: 16/512,238

(22) Filed: Jul. 15, 2019

(65) Prior Publication Data

US 2020/0015494 A1    Jan. 16, 2020

(30) Foreign Application Priority Data

Jul. 16, 2018 (AU) .................................. 2018902569

(51) Int. Cl.
*A23G 3/02* (2006.01)
*A21B 5/00* (2006.01)

(52) U.S. Cl.
CPC ............. *A23G 3/0242* (2013.01); *A21B 5/00* (2013.01); *A23G 3/0268* (2013.01)

(58) Field of Classification Search
CPC ....... A23G 3/0242; A23G 3/0268; A21B 5/00
See application file for complete search history.

(56) References Cited

U.S. PATENT DOCUMENTS

| | | | | |
|---|---|---|---|---|
| 2,163,580 A * | 6/1939 | Bianchi | ................ | A23G 3/2023 99/450.2 |
| 2,649,745 A | 8/1953 | Varak | | |
| 2,818,822 A * | 1/1958 | Greenburg | ............. | A21C 11/10 425/469 |
| 3,128,800 A * | 4/1964 | Faerber | ................ | A23G 3/0252 141/159 |
| 6,242,028 B1 * | 6/2001 | Bean | ..................... | A23G 3/0252 426/660 |
| 2011/0045155 A1 * | 2/2011 | Whetstone, Jr. | ......... | A23G 1/26 425/150 |
| 2017/0064976 A1 | 3/2017 | Tanis | | |

FOREIGN PATENT DOCUMENTS

| | | |
|---|---|---|
| DE | 10 2011 075 602 A1 | 11/2012 |
| WO | 2017/043961 A1 | 3/2017 |
| WO | WO-2017043961 A1 * | 3/2017 ........... A23G 3/0025 |

OTHER PUBLICATIONS

Machine Translation of DE 102011075602 A1 (Year: 2012).*
Dutch search report of corresponding Dutch Patent Application No. NL 2023479, dated Feb. 21, 2020 (nine pages).
Turkish Search Report in corresponding Turkish Application No. 2019/10435 dated Feb. 19, 2021 (nine pages).

* cited by examiner

*Primary Examiner* — Leith S Shafi
(74) *Attorney, Agent, or Firm* — Kilpatrick Townsend & Stockton LLP

(57) ABSTRACT

A die assembly (10) used with a tray (11) employed in a continuous confectionary stark moulding machine/process, in which a plurality of the trays (11) are used. The tray (11) is of a rectangular configuration and includes upwardly extending side walls (12) that surround a space (13) that receives starch, in powder form, typically the powder would be flour.

13 Claims, 3 Drawing Sheets

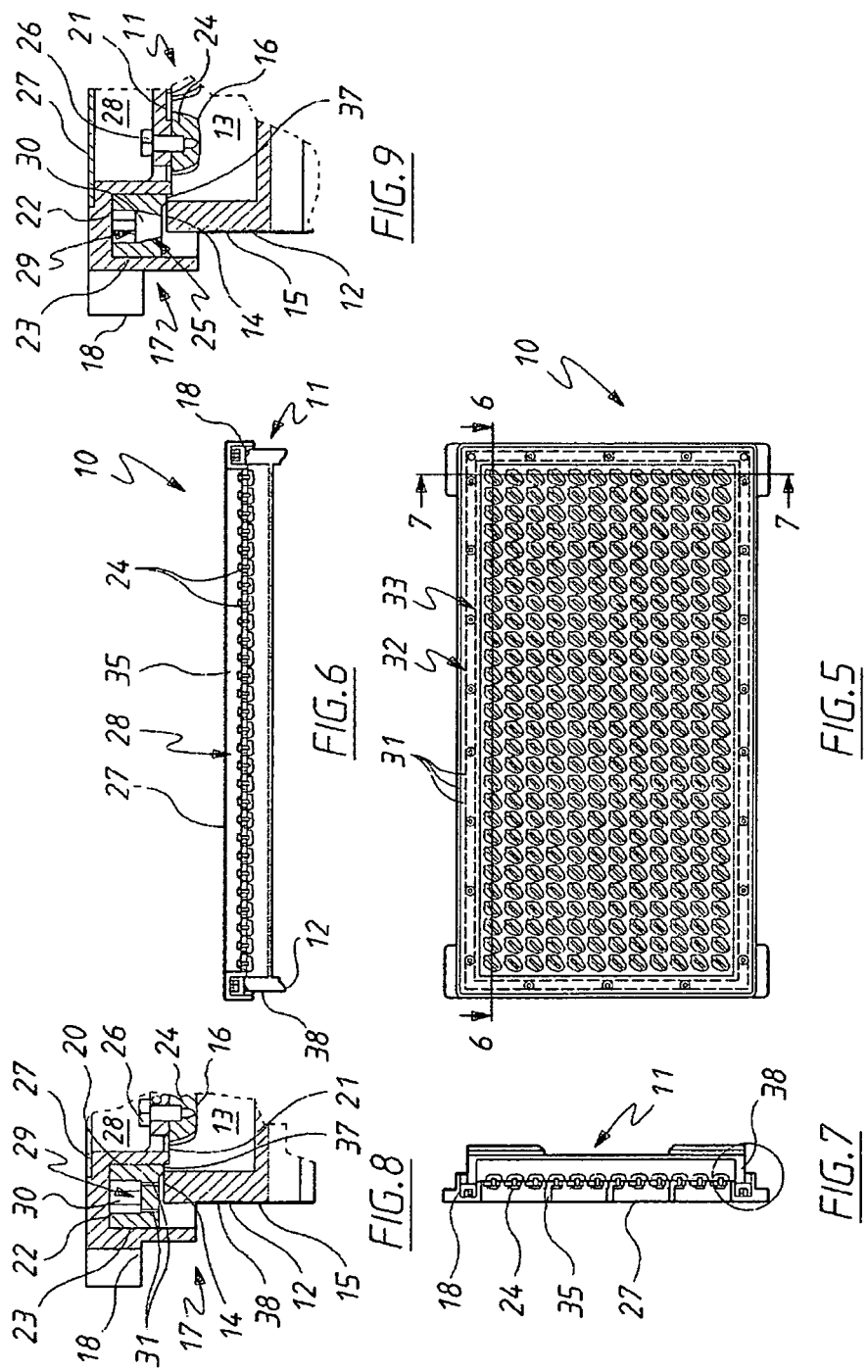

DIE FOR A CONFECTIONERY MOULDING MACHINE

This application claims priority to Australian Patent Application No. 2018902569, filed Jul. 16, 2018, the disclosure of which is incorporated by reference herein.

FIELD

The present invention relates to dies for confectionery moulding machines, and more particularly but not exclusively to confectionery moulding machines that use trays provided with starch, in which a depression is formed. The confectionery is moulded in the depression.

BACKGROUND

In the production of starch based confectionery, the confectionery is formed in a tray. The tray is filled with starch (flour), and impressions made in the starch. The compressions provide a plurality of cavities, with a liquid delivered to the cavities, with the liquid then forming the confectionery when set.

The trays are engaged by a die assembly, with the die assembly having a plurality of dies that are pressed into the starch to form cavities therein.

The die is removed, and the periphery of the tray cleaned so as to remove starch deposited thereon. A liquid is then injected into the cavities, with the trays then stacked and transported to an oven. The liquid sets to form the confectionery.

The confectionery is subsequently moved from the trays together with starch, with the starch then recycled by being reused in subsequent trays.

A disadvantage of the above process is that frequently starch deposited on the edges of the tray and vertical sides of the tray is not removed. This has the problem of hindering correct stacking of the trays, while the starch will frequently drop off onto the surrounding the machinery creating a cleaning problem. Additionally, the starch may be deposited in the cavity, within which the product is formed, thereby detracting from the quality of the confectionery.

OBJECT

It is the object of the present invention to overcome or substantially ameliorate at least one of the above disadvantages.

SUMMARY OF INVENTION

There is disclosed herein a die assembly to engage a tray having a periphery and that receives a powder that is engaged by the die assembly to form a cavity in the powder in which a product having a configuration is formed, the assembly including:

a body of generally rectangular configuration so as to have a pair of spaced first sides that are generally parallel and transversely spaced, and a pair of second sides that are generally parallel and transversely spaced and that extend between the first sides, with the sides surrounding a central area;

a support portion extending across said area and being fixed to the sides;

at least one mould member fixed to the support portion and projecting from the support portion and having a configuration that corresponds to the product configuration and that is to be pressed into the powder to form said cavity; and wherein at least one of the sides has a duct through which a gas passes, and at least one gas outlet/gas inlet communicating with the duct so as to provide at least one gas stream to pass the tray periphery to remove the powder therefrom.

Preferably, the gas passing through the duct is delivered to the duct under pressure, said gas inlet/outlet is a first gas outlet, and said one of the sides has further gas outlet, with each of the gas outlets being in communication with said duct so as to receive the gas under pressure therefrom, so that a plurality of gas streams are generated that are to be directed at the tray periphery.

Preferably, at least one of the gas outlets is a slot.

In an alternative preferred form, each of the gas outlets is a slot.

Preferably, the at least one outlet/inlet is a plurality of gas outlets with the outlets are arranged in a first set of outlets and a second set of outlets, with the first set of outlets being spaced from the second set of outlets, with each set of the outlets being in a respective row, with the rows being spaced.

Preferably, each of the sides is provided with a duct, and a plurality of gas outlets, with the gas outlets of each side communicating with the duct of that side so that a plurality of gas streams are to be directed at the tray periphery.

In an alternative preferred form, the gas passing through the duct is drawn into the duct as a result of reduced air pressure delivered to said duct, said gas inlet/outlet is a first gas inlet, with said gas inlet being a first gas inlet, and said at least one of said sides has further gas inlet, with each gas inlet being in communication with said duct so as to deliver gas thereto, so that a plurality of gas streams are generated that pass the tray periphery.

Preferably, at least one gas inlet is a slot.

In an alternative preferred form, each gas inlet is a slot.

There is further disclosed herein, in combination, the die assembly and tray, with the tray periphery including a top upwardly facing surface that is engaged by the gas streams.

Preferably, the periphery includes upwardly extending side surfaces that are engaged by the gas streams.

BRIEF DESCRIPTION OF DRAWINGS

Preferred forms of the present invention will now be described by way of example with reference to the accompanying drawings wherein:

FIG. 5 is a schematic bottom plan view of the die assembly of FIG. 1;

FIG. 6 is a schematic sectioned side elevation of the die assembly as shown in FIG. 5 sectioned along the line 6-6, engaged with a tray;

FIG. 7 is a schematic sectioned end elevation of the die assembly as shown in FIG. 5 sectioned along the line 7-7, engaged with the tray of FIG. 6;

FIG. 8 is a schematic enlarged view of portion of the die assembly of FIG. 1, engaged with the tray of FIGS. 6 and 7; and FIG. 9 is a schematic enlarged view of a modification of the portion of the die assembly and tray as shown in FIG. 8.

DESCRIPTION OF EMBODIMENTS

Figure 2:
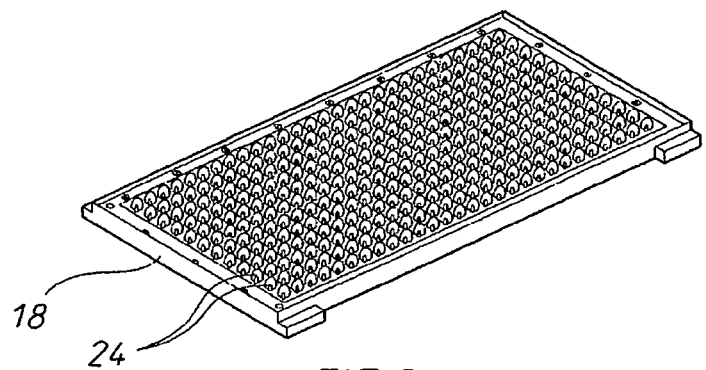
FIG. 2 is a schematic bottom isometric view of the die assembly of FIG. 1.
Figure 1:
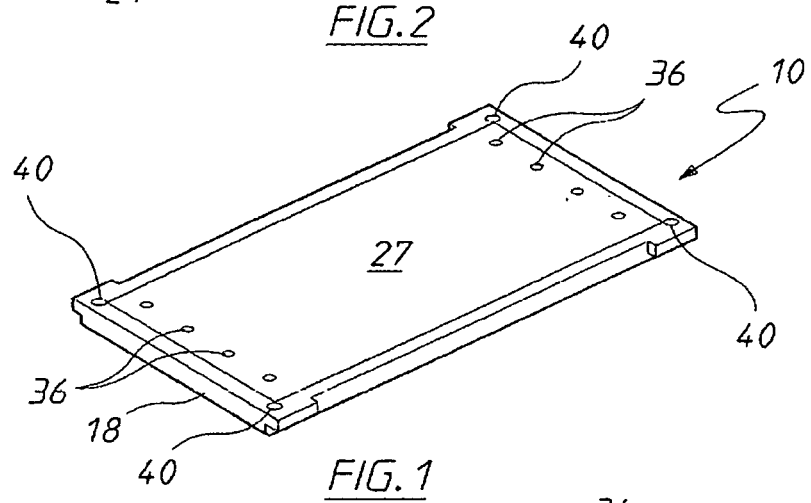
FIG. 1 is a schematic top isometric view of a die assembly.
Figure 3:
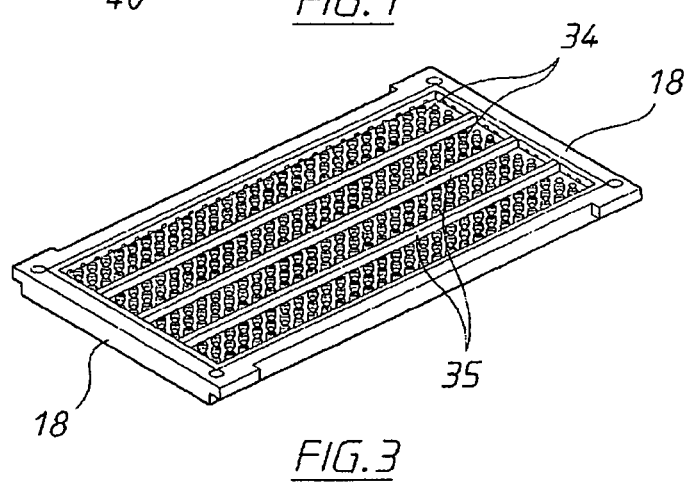
FIG. 3 is a schematic top isometric view of the die assembly of FIG. 1, with a cover sheet removed.
Figure 4:
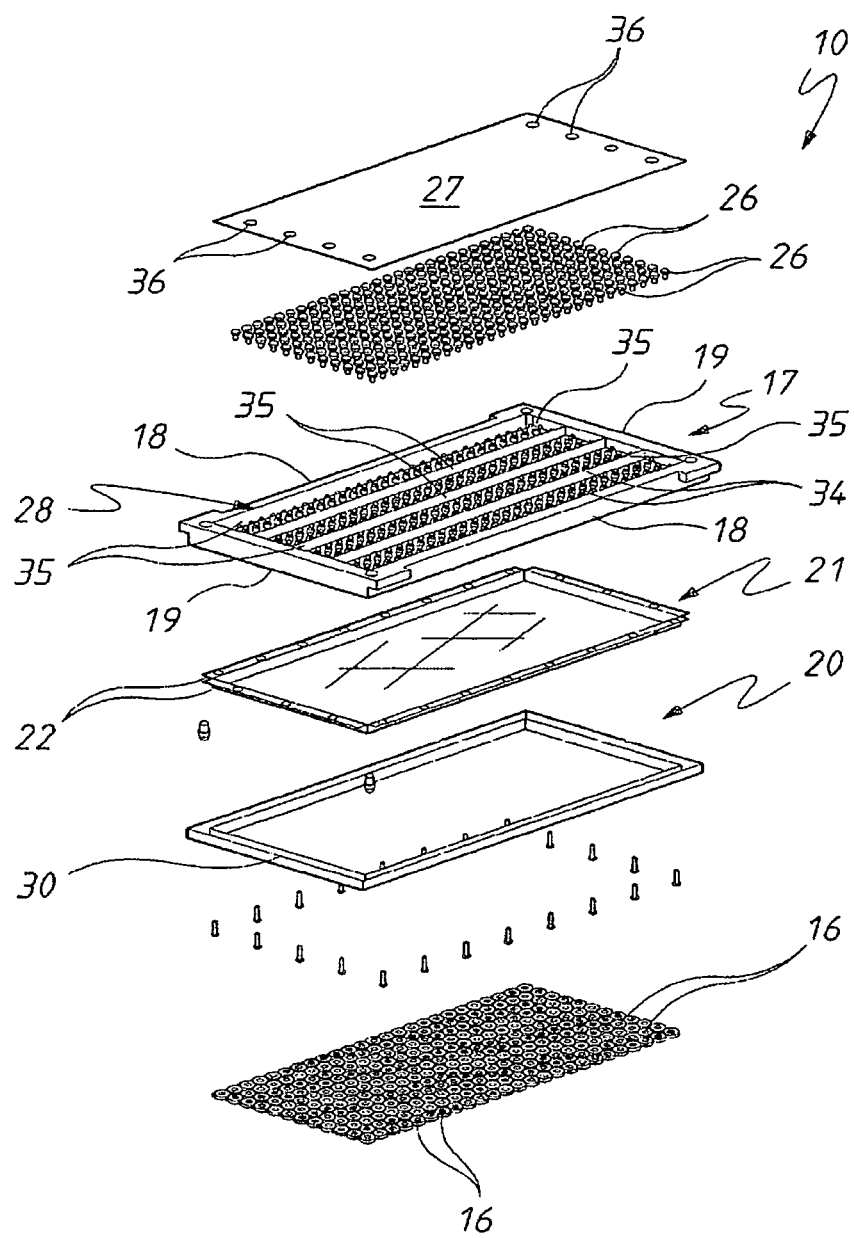
FIG. 4 is a schematic isometric parts exploded view of the die assembly of FIGS. 1 to 3.

In the accompanying drawings there is schematically depicted a die assembly 10. The die assembly 10 would be employed in a continuous confectionery starch moulding machine/process, in which a plurality of trays 11 are used. The trays 11 are of a rectangular configuration and include upwardly extending side walls 12 that surround a space 13 that receives starch, in powder form, typically the powder would be flour. The walls 12 have upwardly facing generally horizontal edge surfaces 14 and generally vertical side walls 15. The walls 15 provide side surfaces 38. In use, once a plurality of die cavities 16 is formed, the trays 11 are stacked and placed in an oven. A liquid is injected into each of the cavities 16, with the liquid then setting to form the confectionery, The die assembly 10 is mounted in a moulding machine, and is reciprocated with respect to the trays 11 located below the assembly 10.

The trays 11 are intermittently moved, so that each tray 11 is located below the assembly 10. Once below the assembly 10, the tray 11 is engaged by the die assembly 10. The die assembly 10 is vertically reciprocated.

The die assembly 10 includes a body 17 that is essentially a rectangular frame having a pair of longitudinal sides 18 that are generally parallel, transversely spaced and co-extensive, and a pair of transverse sides 19 that are transversely spaced, generally parallel and co-extensive, and that extend generally perpendicularly to and are attached to the sides 18. In this embodiment the sides 18 are longer than the sides 19. However, the body 17 may also be of a square configuration.

Secured to the body 17 by a frame 20 is a central portion in the form of a mesh member 21. The mesh member 21 has a periphery 22 providing a lip that is located between the body 17 and frame 20. Each of the side walls 18/19 has a peripheral groove 23 within which the periphery 22 is located, together with the frame 23, to secure the mesh member 21 to the body 17.

Fixed to the body 17, through the mesh member 21, is a plurality of dies 24 that form the cavities 16. The dies 24 have a shape/configuration, corresponding to the shape of the confectionery being formed.

Each of the dies 24 is secured to the body 17 by means of a bolt 26. Each bolt passes through the member 21.

Extending between the sides 18 and 19 is a hood 27 that closes a chamber 28 surrounded by the side walls 18/19 of the body 17 and the mesh member 21.

As is best seen in FIG. 8, the dies 24 project from the mesh member 21 into the space 13 to form the cavities 16.

The body 17, in corporation with the frame 20, provides a passage 29 to which a gas (air) is delivered under pressure. In this embodiment the passage 29 is provided by a slot 30, formed in the frame 20, and that is closed by the body 17. The air under pressure is supplied via passages 36 that are connected to the passages 29.

Extending from the passage 29 is a plurality of outlets 31 that provide a plurality of gas streams, that exit the passage 29, that are directed toward the surfaces 14 and side surface 15.

In this embodiment, the outlets 31 are slots, as best seen in FIG. 5, with the outlets 31 are arranged in two rows 32 and 33. The outlets 31 of the row 32 are offset relative to the outlets 31 in the row 33.

The row 33 has the outlets 31 arranged so that air streams are directed at the surface 14. The outlets 31 of the row 32 are directed at the upwardly extending side surface 38.

In an alternative embodiment, as shown in FIG. 9, a reduced air pressure (relative to atmosphere) is delivered to the passages 29 so that air is drawn into the inlets 25. The air entering the inlets 25 generates gas streams that carry with them at least some of the starch in surfaces 14 and walls 15.

In this embodiment, the reduced air pressure is delivered to the passages 40.

Preferably in one embodiment, the body 17 has a plurality of dividing members 35 that divide the chamber 28 into sub-chambers 34.

The hood 27 has a plurality of inlets 36 that provide for the delivery of air under pressure to the sub-chambers 34.

When the confectionery has been removed, and the starch is to be recycled, air under pressure is delivered to the sub-chambers 34 to at least aid in removing starch from the mesh member 21 and from around dies 24, and bolts 26.

Preferably the frame 20 has a ridge 37 extending along the length of each side 18/19, that engages an edge of the surface 14 to aid in sealingly connecting the frame 20 with the tray 11. In one embodiment the ridge 37 is formed of resilient material and fixed to the remainder of the frame 20. When the assembly 10 is applied to the frame 20, so that the ridge 37 engages the frame 20, air entering or leaving the outlets 31 does not force starch back into the space 13 and/or chamber 28 from the surfaces 14 or walls 15.

In operation of the die assembly 10, the outlets 31 remove starch from the surfaces 14 and 38, while the ridge 37 at least inhibits the starch being "blown" towards cavities 16. Accordingly, the periphery (surfaces 14 and 38) is at least partly cleaned by the removal of starch by the gas streams entering or leaving the outlets 31.

The invention claimed is:

1. A die assembly to engage a tray having a tray periphery and that receives a powder that is engaged by the die assembly to form a cavity in the powder in which a product having a configuration is formed, the die assembly comprising:
    a body of generally rectangular configuration including:
        a pair of first sides that are generally parallel and transversely spaced, and
        a pair of second sides that are generally parallel and transversely spaced and that extend between the pair of first sides, with the pair of first sides and the pair of second sides surrounding a central area;
    a support portion extending across the central area and being fixed to the pair of first sides and the pair of second sides;
    at least one mould member fixed to the support portion and projecting from the support portion such that, when the tray is engaged by the die assembly, the at least one mould member presses into the powder to form at least one cavity in the powder;
    at least one duct through which a gas passes, the at least one duct being integrated within at least one of the pair of first sides and the pair of second sides; and
    at least one gas outlet or gas inlet that communicates with the at least one duct so as to provide at least one gas stream to pass the tray periphery to remove the powder therefrom.

2. The die assembly of claim 1, wherein the gas is delivered to the duct under pressure, the at least one gas outlet or gas inlet comprises a first gas outlet and a second gas outlet with each of the first gas outlet and the second gas outlet being in communication with the duct so as to receive the gas under pressure therefrom, so that a plurality of gas streams are generated that are to be directed at the tray periphery.

3. The die assembly of claim 2, wherein at least one of the at least one gas outlet or gas inlet is a slot.

4. The die assembly of claim 2, wherein each of the at least one gas outlet or gas inlet is a slot.

5. The die assembly of claim 1, wherein the at least one gas outlet or gas inlet comprises a plurality of gas outlets that are arranged in a first set of gas outlets and a second set of gas outlets, wherein the first set of gas outlets are spaced from the second set of gas outlets, the first set of gas outlets being in a first row, the second set of gas outlets being in a second row, and the first row being spaced from the second row.

6. The die assembly of claim 1, wherein the at least one gas stream is a plurality of gas streams, wherein the duct is a first duct within a first side of the pair of first sides, and further comprising:
  a second duct within a second side of the pair of first sides;
  a third duct within a first side of the pair of second sides;
  a fourth duct within a second side of the pair of second sides, wherein the at least one gas outlet comprises:
  a first plurality of gas outlets at the first side of the pair of first sides, the first plurality of gas outlets communicating with the first duct;
  a second plurality of gas outlets at the second side of the pair of first sides, the second plurality of gas outlets communicating with the second duct;
  a third plurality of gas outlets at the first side of the pair of second sides, the third plurality of gas outlets communicating with the third duct; and
  a fourth plurality of gas outlets at the second side of the pair of second sides, the fourth plurality of gas outlets communicating with the fourth duct so that the plurality of gas streams are directed at the tray periphery.

7. The die assembly of claim 1, wherein the gas passing through the at least one duct is drawn into the at least one duct as a result of reduced air pressure delivered to the at least one duct, wherein the at least one gas outlet or gas inlet comprises a first gas inlet and a second gas inlet, with each of the first gas inlet and second gas inlet being in communication with the duct so as to deliver gas thereto, so that a plurality of gas streams are generated that pass the tray periphery.

8. The die assembly of claim 7, wherein at least one of the first gas inlet and the second gas inlet is a slot.

9. The die assembly of claim 7, wherein each of the first gas inlet and the second gas inlet is a slot.

10. In combination, the die assembly of claim 1 and the tray wherein the tray periphery comprises a top upwardly facing surface that is engaged by a plurality of gas streams.

11. The combination of claim 10, wherein the tray periphery comprises upwardly extending side surfaces that are engaged by the plurality of gas streams.

12. A system comprising:
  a tray comprising:
    a rectangular surface;
    a sidewall connected to the rectangular surface that surrounds a space above the rectangular surface configured to receive a powder, wherein the sidewall includes:
      a top surface; and
      a side surface;
  a die assembly positioned above the tray and configured to engage the tray, the die assembly comprising:
    a body of generally rectangular configuration including:
      a pair of first sides that are generally parallel and transversely spaced, and
      a pair of second sides that are generally parallel and transversely spaced and that extend between the pair of first sides, with the pair of first sides and the pair of second sides surrounding a central area;
    a support portion extending across the central area and being fixed to the pair of first sides and the pair of second sides;
    at least one mould member fixed to the support portion and projecting from the support portion such that, when the tray is engaged by the die assembly, the at least one mould member presses into the powder to form at least one cavity in the powder;
    at least one duct through which a gas passes, wherein the gas passing through the duct is drawn into the duct as a result of reduced air pressure, the at least one duct being provided by at least one of the pair of first sides and the pair of second sides; and
    at least one gas inlet extending from the at least one duct and positioned above the top surface of the sidewall of the tray when the die assembly engages the tray, wherein the at least one gas inlet communicates with the at least one duct so as to deliver the gas to the at least one duct, and so as to provide at least one gas stream that is directed upward from the top surface of the sidewall of the tray to remove the powder from the top surface of the sidewall of the tray.

13. A system comprising:
  a tray comprising:
    a rectangular surface;
    a sidewall connected to the rectangular surface that surrounds a space above the rectangular surface configured to receive a powder, wherein the sidewall includes:
      a top surface; and
      a side surface;
  a die assembly positioned above the tray and configured to engage the tray, the die assembly comprising:
    a body of generally rectangular configuration including:
      a pair of first sides that are generally parallel and transversely spaced, and
      a pair of second sides that are generally parallel and transversely spaced and that extend between the pair of first sides, with the pair of first sides and the pair of second sides surrounding a central area;
    a support portion extending across the central area and being fixed to the pair of first sides and the pair of second sides;
    at least one mould member fixed to the support portion and projecting from the support portion such that, when the tray is engaged by the die assembly, the at least one mould member presses into the powder to form at least one cavity in the powder;
    at least one duct through which a gas passes, wherein the gas passing through the duct is drawn into the duct as a result of reduced air pressure, the at least one duct being provided by at least one of the pair of first sides and the pair of second sides; and
    at least one gas outlet extending from the at least one duct and positioned above the top surface of the sidewall of the tray when the die assembly engages the tray, wherein the at least one gas outlet communicates with the at least one duct so as to receive the gas from the at least one duct, and so as to provide at least one gas stream that is directed toward the top surface of the sidewall of the tray to remove the powder from the top surface of the sidewall of the tray.

\* \* \* \* \*